(12) United States Patent
Höller et al.

(10) Patent No.: US 7,050,421 B1
(45) Date of Patent: May 23, 2006

(54) ATM NETWORK PROVIDING TRANSPARENTLY NARROWBAND BASED TELEPHONY SERVICES WITHOUT REQUIRING ATM-SWITCHING

(75) Inventors: Jan Höller, Stockholm (SE); Lennart Norell, Älvsjö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/332,050

(22) Filed: Jun. 14, 1999

Related U.S. Application Data

(63) Continuation of application No. PCT/SE97/02189, filed on Dec. 19, 1997.

(30) Foreign Application Priority Data

Dec. 20, 1996 (SE) .................................... 9604734

(51) Int. Cl.
H04L 12/66 (2006.01)
H04L 12/56 (2006.01)

(52) U.S. Cl. .................................. 370/352; 370/395.53

(58) Field of Classification Search ........ 370/351–356, 370/400–402, 395.2–395.31, 395.54, 522, 370/395.4, 395.6, 395.61
See application file for complete search history.

(56) References Cited

U.S. PATENT DOCUMENTS

| | | | |
|---|---|---|---|
| 5,204,857 A | | 4/1993 | Obara |
| 5,293,570 A | | 3/1994 | Schmidt et al. |
| 5,375,118 A | | 12/1994 | Rao et al. |
| 5,444,702 A | | 8/1995 | Burnett et al. |
| 5,452,295 A | * | 9/1995 | Nakagaki et al. ........ 370/395.2 |
| 5,452,297 A | | 9/1995 | Hiller et al. |
| 5,483,527 A | | 1/1996 | Doshi et al. |
| 5,568,475 A | * | 10/1996 | Doshi et al. ................. 370/352 |
| 5,600,641 A | * | 2/1997 | Duault et al. ............... 370/400 |
| 5,737,333 A | * | 4/1998 | Civanlar et al. ............ 370/352 |
| 5,751,706 A | | 5/1998 | Land et al. |
| 5,784,371 A | * | 7/1998 | Iwai .......................... 370/356 |
| 5,802,045 A | | 9/1998 | Kos et al. |
| 5,805,588 A | | 9/1998 | Petersen |
| 5,828,844 A | * | 10/1998 | Civanlar et al. ....... 370/395.54 |

(Continued)

FOREIGN PATENT DOCUMENTS

EP 0 554 969 A2 8/1993

(Continued)

OTHER PUBLICATIONS

U.S. Appl. No. 09/353,135, filed Jul. 14, 1999 entitled "Narrowband Applications Using ATM Switching and Transport".

(Continued)

*Primary Examiner*—Steven Nguyen
(74) *Attorney, Agent, or Firm*—Nixon & Vanderhye, P.C.

(57) ABSTRACT

Narrowband based telephony services and associated value added services are provided transparently in a network providing ATM switching and no STM switching is required in an ATM network (625) to which units (601, 603) requiring such services are connected. This is obtained by means of, when a call enters the ATM network (625), first finding the output port (619) from the ATM network (625), then returning the address of that port to the entry port (617) and thereafter ATM switch the connection directly through the ATM network (625). Hereby bandwidth resources are more efficiently used since all switching is done by ATM regardless of application. Heavy investments in providing intelligent services support by existing systems can be reused in an efficient way and thus reduce time to market for the introduction of the value added services.

14 Claims, 11 Drawing Sheets

U.S. PATENT DOCUMENTS

| | | | |
|---|---|---|---|
| 5,872,785 A | | 2/1999 | Kienberger |
| 6,078,584 A | | 6/2000 | Mottishaw et al. |
| 6,081,525 A | * | 6/2000 | Christie et al. ........... 370/395.3 |
| 6,094,431 A | * | 7/2000 | Yamato et al. ......... 370/395.21 |
| 6,584,094 B1 | * | 6/2003 | Maroulis et al. ............ 370/352 |

FOREIGN PATENT DOCUMENTS

| | | |
|---|---|---|
| EP | 0 928 123 A2 | 7/1999 |
| EP | 0 989 771 A2 | 3/2000 |
| GB | 2 322 515 A | 8/1998 |
| WO | 95/17789 | 6/1995 |
| WO | WO 96/25017 | 8/1996 |
| WO | 96/29840 | 9/1996 |
| WO | 97/09807 | 3/1997 |
| WO | WO 97/09807 | 3/1997 |
| WO | 97/48210 | 12/1997 |
| WO | 99/57851 | 11/1999 |

OTHER PUBLICATIONS

McKinney et al., "ATM For Narrow Band Services", IEEE Communications Magazine, IEEE Service Center, Piscataway, NJ, vol. 32, No. 4, Apr. 1, 1994, pp. 64-72.

Gong et al, "Implementation of an ATM Switch for PSTN/N-ISDN Services", In: ATM, 1999 ICATM'99, 1999 $2^{nd}$ Int'l. Conference, pp. 413-419, Jun. 21-23, 1999.

Park et al, "Network Interworking for Narrowband Services Over an ATM Network", In ATM, 1998, ICATM-98, 1998 $1^{st}$ IEEE Int'l. Conference, pp. 200-226, Jun. 22-24, 1998.

* cited by examiner

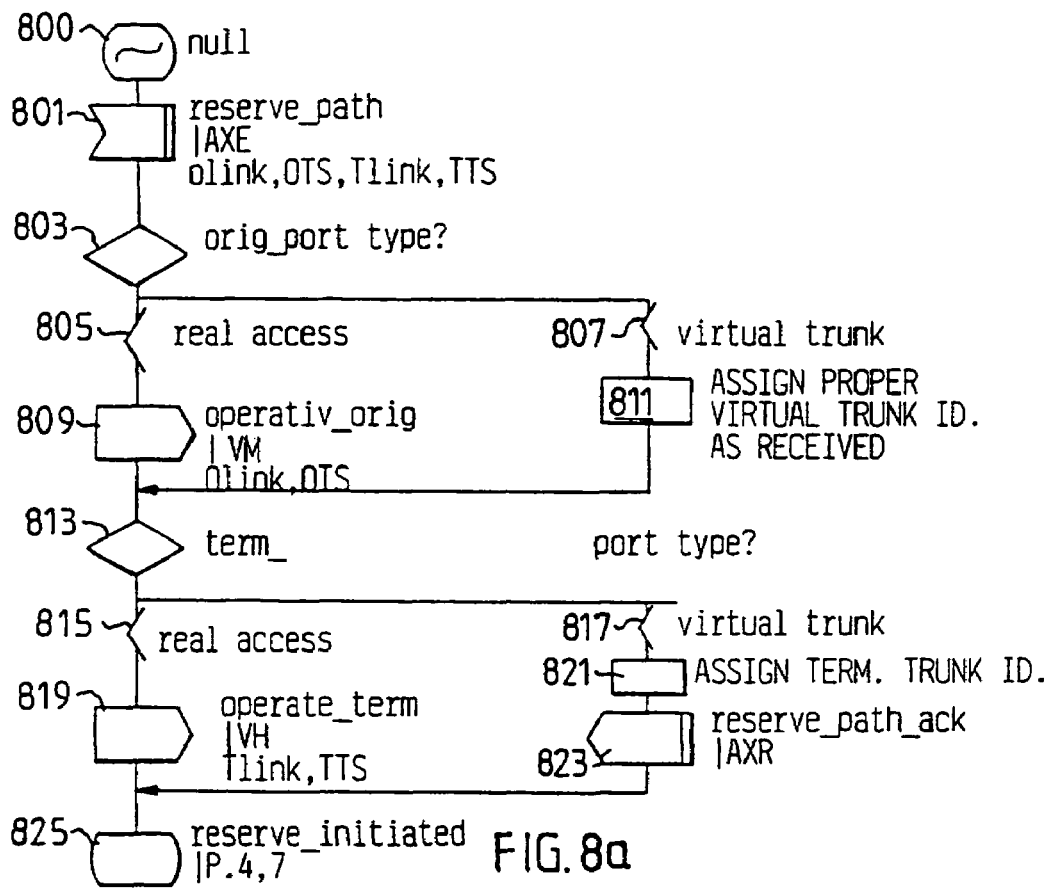
FIG. 8a
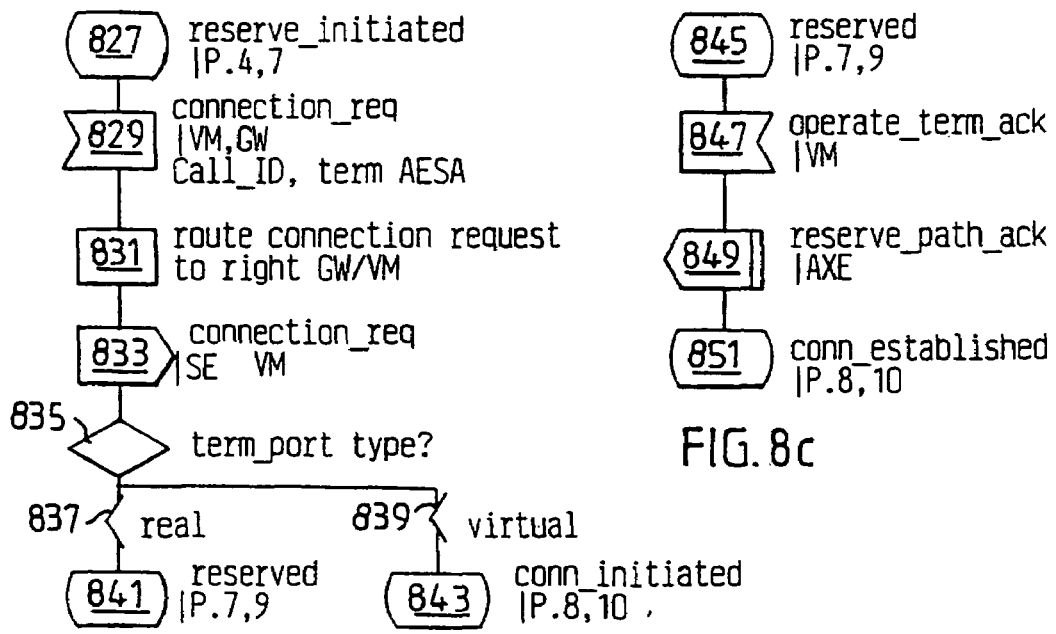
FIG. 8b
FIG. 8c

*) If CONNECT already has been received from BSN, continue without waiting.

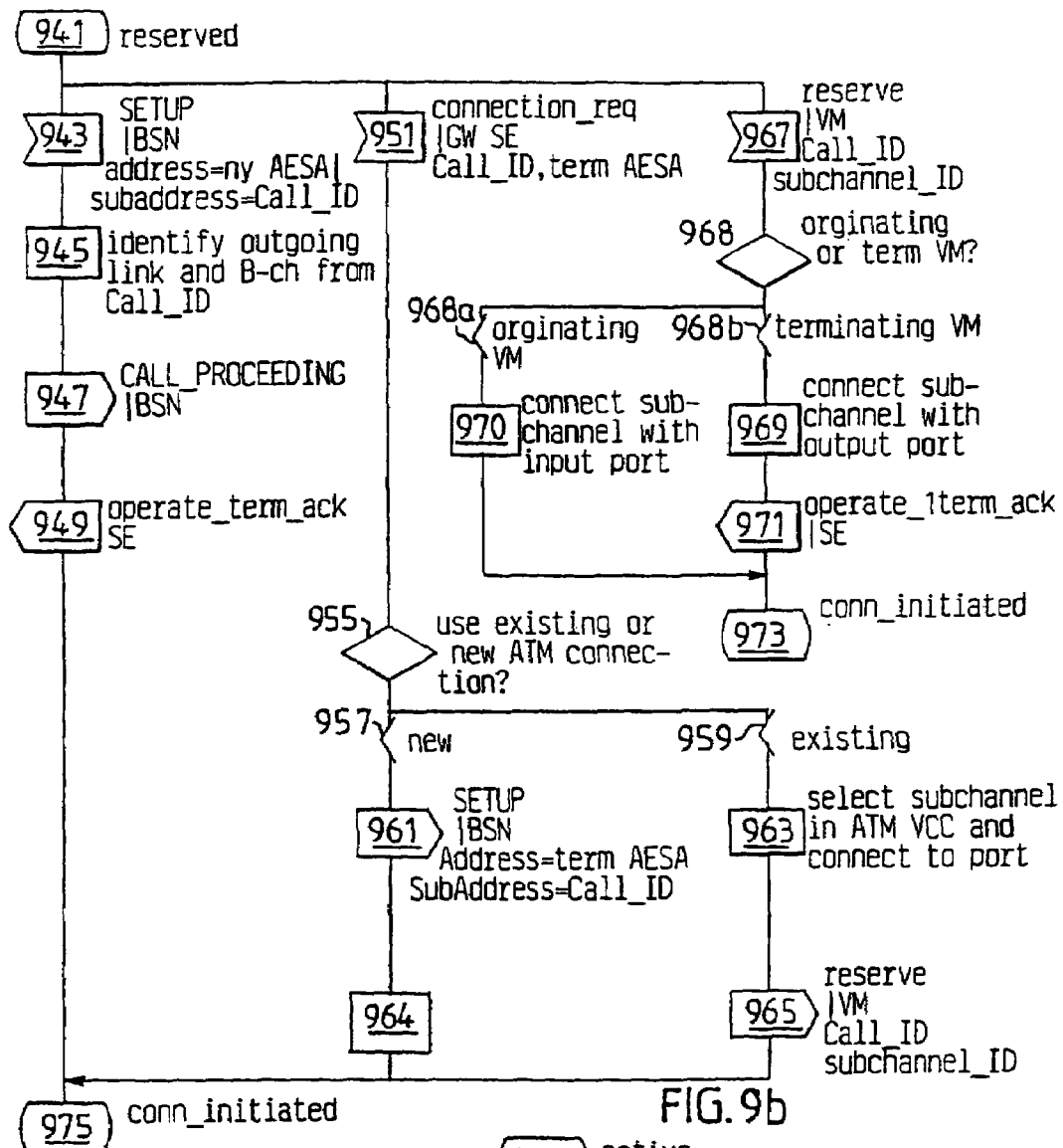
FIG.9b
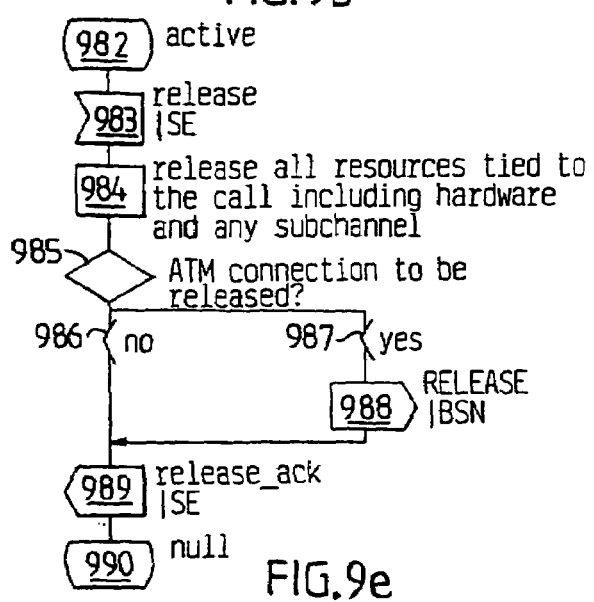
FIG.9c
FIG.9e

ATM NETWORK PROVIDING TRANSPARENTLY NARROWBAND BASED TELEPHONY SERVICES WITHOUT REQUIRING ATM-SWITCHING

This application is a continuation of PCT/SE97/02189 filed Dec. 19, 1997.

TECHNICAL FIELD

The present invention relates to a method and system for switching calls in an Asynchronous Transfer Mode (ATM) network.

TECHNICAL BACKGROUND AND PRIOR ART

The telecommunication and data communication networks are today built as separate overlay networks. The result is that transport and switching for data belonging to different applications are performed in separate equipment, e.g. Frame Relay switches and networks for one type of LAN-to-LAN interconnect traffic and PSTN/ISDN switches and networks for voice traffic. With the introduction of ATM, a common switching network is possible for all these services. This also facilitates a common access for all types of traffic, e.g. data, voice and video, thus reducing the amount of network equipment.

However, for voice traffic, a number of supplementary services have been developed for both the end-user and the service provider. Such services can be screening services for closed user groups, call distribution services, flexible billing mechanisms, various access methods, etc. This multitude of services is implemented in today's narrowband equipment supporting PSTN and ISDN.

When providing a common access point, and transport and switching function by using ATM for both voice, data and video, a new network has to be built having these switching capabilities.

A requirement is that a new network using ATM as the common switching method has to provide all existing services supported by the narrowband voice networks in operation today. Neither the end-user nor the service provider can be requested to drastically lower the service content by the introduction of ATM.

The existing solution to meet this requirement is to use ATM as a pure transport mechanism. This is done by trunking either point-to-point between narrowband equipment such as PBXs or access devices, or by trunking towards a narrowband switch, see-ATM Forum/95-0446R9, Baseline Text for Voice and Telephony Over ATM—ATM Trunking For Narrowband Services, ATM Forum, August, 1996.

Thus, for example in FIG. 1, two different narrowband equipments 101 and 103 are shown, which communicate, at least partly, over an ATM network 105 to which a narrowband switch 107 also is connected. The narrowband switch can for example be an AXE switch manufactured by the company Ericsson. In the figure, the interfaces A are existing narrowband trunks comprising voice circuits and signalling capabilities. The line I illustrates a point-to-point trunking of the complete narrowband trunk between the two narrowband equipments, and connections II provide the capabilities of providing telephony services with ATM transport, but no switching.

The problems associated with the existing solutions are:

i) The trunking for point-to-point trunks (I) generally requires a meshed network, i.e. in order to interconnect N narrowband equipments/network access points N(N-1)/2 trunks through the ATM network are required.

ii) Trunking towards a narrowband switch still requires that all voice traffic is STM (Synchronous Transfer Mode) switched in the narrowband switch, and the ATM switching capabilities are not used. An extra STM-ATM transition also introduces delays that must be coped with, or affected voice quality will have to be accepted.

iii) There will be a waste of resources in the ATM network, the capabilities of which are not fully used.

A description of how this is proposed to be implemented in the network is provided by ATM Forum in their Voice and Telephony Over ATM (VTOA) group.

Also the international patent application WO/97 09807, describes a system for providing virtual connections through an interworking multiplexer on a call by call basis. The system uses established ATM connections.

SUMMARY

It is an object of the present invention to provide a system and a method which allow for the ATM network to be utilized in a more efficient manner and by means of which the problems as outlined above effectively can be overcome.

This object and others are obtained by using ATM as the switching mechanism and at the same time providing all existing value added telephony services to an ATM based network. This can be achieved by means of providing logical units connected between the ATM network and the existing narrowband switches and providing the terminals at the interface between the STM network and the ATM network with some additional logic functions by means of which they can interact with the logical units connected to the narrowband switches.

The logical units are used for identifying the output port from the ATM network to which a call entering the ATM network is to be switched. This is carried out by means of using the information and logic contained in the narrowband switches. The address of the output port is then returned to the entry port by means of a special protocol. All traffic is then directed directly to the output port from the incoming port through the ATM network. During the transport through the ATM network the logical unit emulates a virtual connection which is provided to narrowband switches. When the connection is released, this is sensed by the logical units which in turn releases the emulated virtual connection which is seen by the narrowband switch. During the existence of a connection, the call is fully controlled by the narrowband switches.

There are several advantages associated with this method compared to existing ones. Hence, narrowband based telephony services and associated value added services are provided transparently by the network providing ATM switching and no STM switching is required.

Also, the network bandwidth resources are more efficiently used since all switching is done by ATM regardless of application.

The ATM network is a switched ATM network, i.e. ATM signalling is used both for establishing and disconnecting connections through the ATM network, at any level of the ATM network, e.g. at the AAL2 level.

Furthermore, heavy investments in providing intelligent services support by existing systems can be reused in an efficient way and thus reduce time to market for the introduction of the value added services.

The method as described provides a feasible and viable migration path for existing voice networks such as PSTN and ISDN towards an ATM based multiservice network, and the implementation of the method in an ATM system provides pure ATM operators with a possibility for a competitive service offering with minimum investments.

BRIEF DESCRIPTION OF THE DRAWINGS

The present invention will now be described in more detail by way of non-limiting examples and with reference to the accompanying drawings, in which:

FIGS. 8a–8f are flow charts illustrating the different procedures carried out in a switch emulator.

FIGS. 9a–9e are flow charts illustrating the different procedures carried out in a voice multiplexer attached to the same ATM network as the switch emulator of FIGS. 8a–8f.

DESCRIPTION OF PREFERRED EMBODIMENTS

Figure 2:
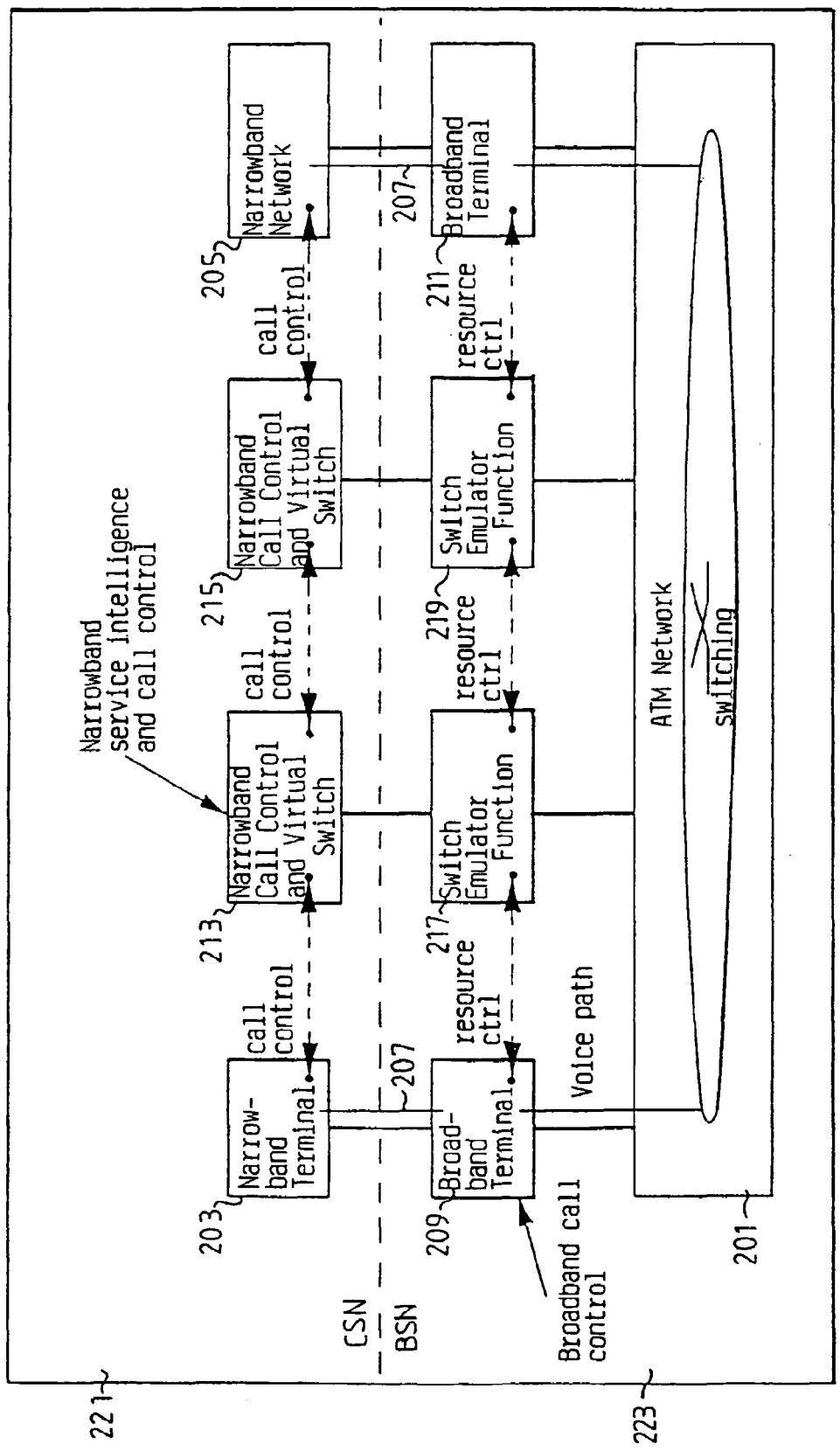
FIG. 2 is a schematic image illustrating the setup of a call connection using logical units or switch emulators.

FIG. 2 illustrates the separation of a call connection into a Call Services Network (CSN) 221 and a Bearer Services Network (BSN) 223. Thus, an ATM network is shown at 201, and a narrowband terminal at 203, which is connected to the ATM network 201 via a broadband terminal 209. Also, a narrowband network 205 is connected to the ATM network 201, via a broadband terminal 211. Narrowband switches 213 and 215 are also connected to the ATM network and the switches 213 and 215 are equipped with switch emulators 217 and 219, respectively.

It should be noted that other applications, e.g. Frame Relay or Internet applications, using the same ATM switching network 201 are not included in the figure.

The CSN call control procedures can be supported by any existing narrowband signalling protocol, e.g. ISDN signalling (Q.931), Qsig, ISUP etc. These protocols are carried transparently between the narrowband entities in CSN through the BSN.

The call control procedures used in the BSN are used for the establishment and release of resources for voice transport. These procedures can be supported by any existing or future protocols used for this purpose, e.g. Q.2931, P—NNI or B-ICI. The BSN call control procedures are invoked upon request by the CSN.

The resource control procedures are present to support a switch emulator function and handle resources towards narrowband access and trunk sides.

The narrowband terminal (TE) 203 can be a PBX or a PSTN/ISDN access stage, e.g. remote subscriber stage. The narrowband network 205 can be any existing network such as ISDN or PSTN.

The broadband terminals (B-TE) 209 and 211 handle the interworking of voice transport circuits to ATM transport e.g. using AAL1, AAL2 or AAL5, depending on choice of ATM adaptation function. Such a broadband terminal functions as a terminal to the ATM network. It can hence connect either to a narrowband terminal, for example the terminal 203, or a network, for example the network 205.

Figure 3:
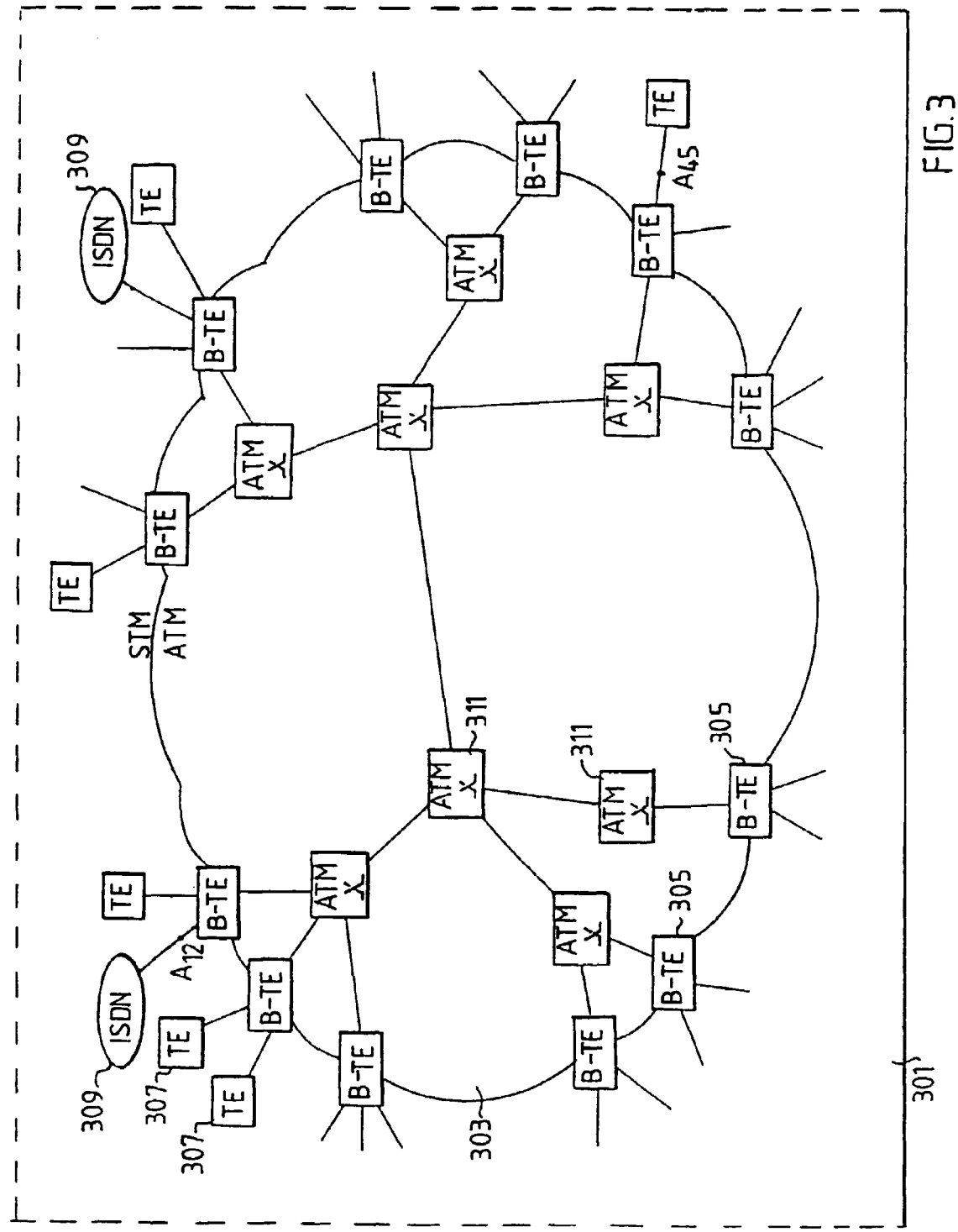
FIG. 3 is a general view illustrating an ATM network to which different STM connections are connected.

In FIG. 3, a network comprising both an STM part 301 and an ATM part 303 is shown. Also shown are broadband terminals (B-TEs) 305, described above in conjunction with FIG. 2, in the interface between the STM part 301 and ATM part 303, narrowband terminals (TEs) 307, ISDN connections 309 and ATM switches 311 forming an ATM switching network 201 in FIG. 2. The ATM switches 311 are thus connected to each other. Some ATM switches are only connected to other ATM switches whereas others, at the border of the ATM network, are also connected to the broadband terminals 305. A broadband terminal 305 is connected to one ATM switch 311 and to devices outside the ATM network, e.g. to a ISDN connection 309 and a multitude of narrowband terminals 307.

Figure 4:
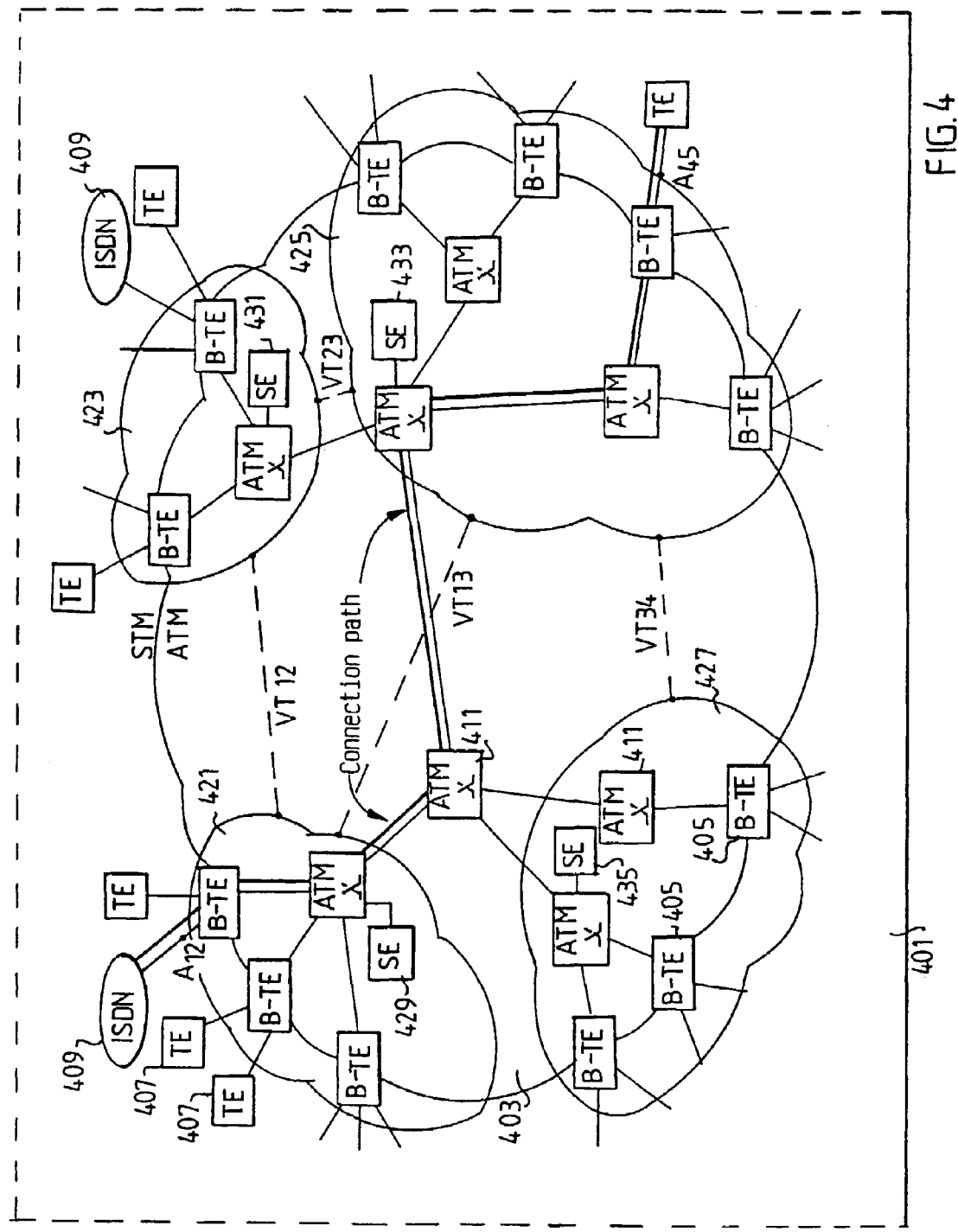
FIG. 4 illustrates an example of how the switch emulators can be used for obtaining a more efficient switching through the ATM network shown in FIG. 3.

In FIG. 4, having the same reference numerals as FIG. 3, but increased by 100, the substantial portion of the ATM network is divided into four different switching domains 421, 423, 425 and 427 equipped with a switch emulator (SE) each, shown at 429, 431, 433 and 435 respectively and connected to one ATM-switch in the respective domain. All SEs are in turn connected to a narrowband switch (not shown) each. The narrowband switches are responsible for the switching in their switching domains 421, 423, 425 and 427, respectively. The switch emulators 429, 431, 433 and 435 are preferably co-located with their corresponding narrowband switches (not shown)

The operation of the network in FIG. 2, will now be described as an example where the bearer service network is given in the FIGS. 3 and 4.

Thus, if a voice path 207 is to be established between the narrow band terminal 203 and the narrow band network 205 via the ATM network 201, the switch emulator or logic unit 217 emulates an STM switch to the narrowband call control and a virtual connection is set up. The narrowband call procedures require that STM resources are reserved in the ATM network 201 for voice transport. The switch emulators 217, 219 provide emulation of these resources towards the narrowband switch logic in the switches 213 and 215. The actual voice transport does hence not pass any STM switching function and is switched on a call-by-call basis on-demand purely in the ATM network. The switch emulator handles resource control as described above for accesses and trunks and uses ATM for its transport.

An example of the control of the resources, i.e. accesses and trunks, performed by the switch emulator 217 is given in FIGS. 3 and 4. Each of the switch emulators 217, 219 handles a number of accesses towards the TEs and narrowband networks. Each switch emulator also handles a number of Virtual Trunks (VTs) between the switch emulators. The virtual trunk is introduced to reflect the routes possible to take in the CSN and has no physical counterpart in the actual BSN. The accesses and trunks are defined in the same manner as in existing narrowband switches. The virtual nature of the trunks is hidden to the logic functions of the narrowband switch. In FIG. 4, four SEs are indicated, and also four VTs between these SEs.

As an example, consider a call that extends between the access points A12 and A45 in FIG. 3, i.e., between a TE and an access towards ISDN. The path selected by the logic functions of the narrowband switch in its call routing function uses the route VT13, shown in FIG. 4. The logical call path traverses two logical narrowband switches (not shown), which are preferably co-located with the SEs 429 and 433. The routing tables are set up according to the desired CSN topology using addresses of the access (Aij) and selected routes (VTk1). The routing information and the resulting CSN topology are independent of the underlying BSN topology and structure, and can be made independent of, or part of, the BSN's addressing scheme, whichever is desired.

The switch emulator function can be implemented in the ATM system, in the narrowband system or as a standalone system adjunct to an ATM system and the narrowband system.

There are many different methods for making a call setup using the switch emulator(s), and two methods of setting up a call will now be described and explained in the following paragraphs.

Figure 1:
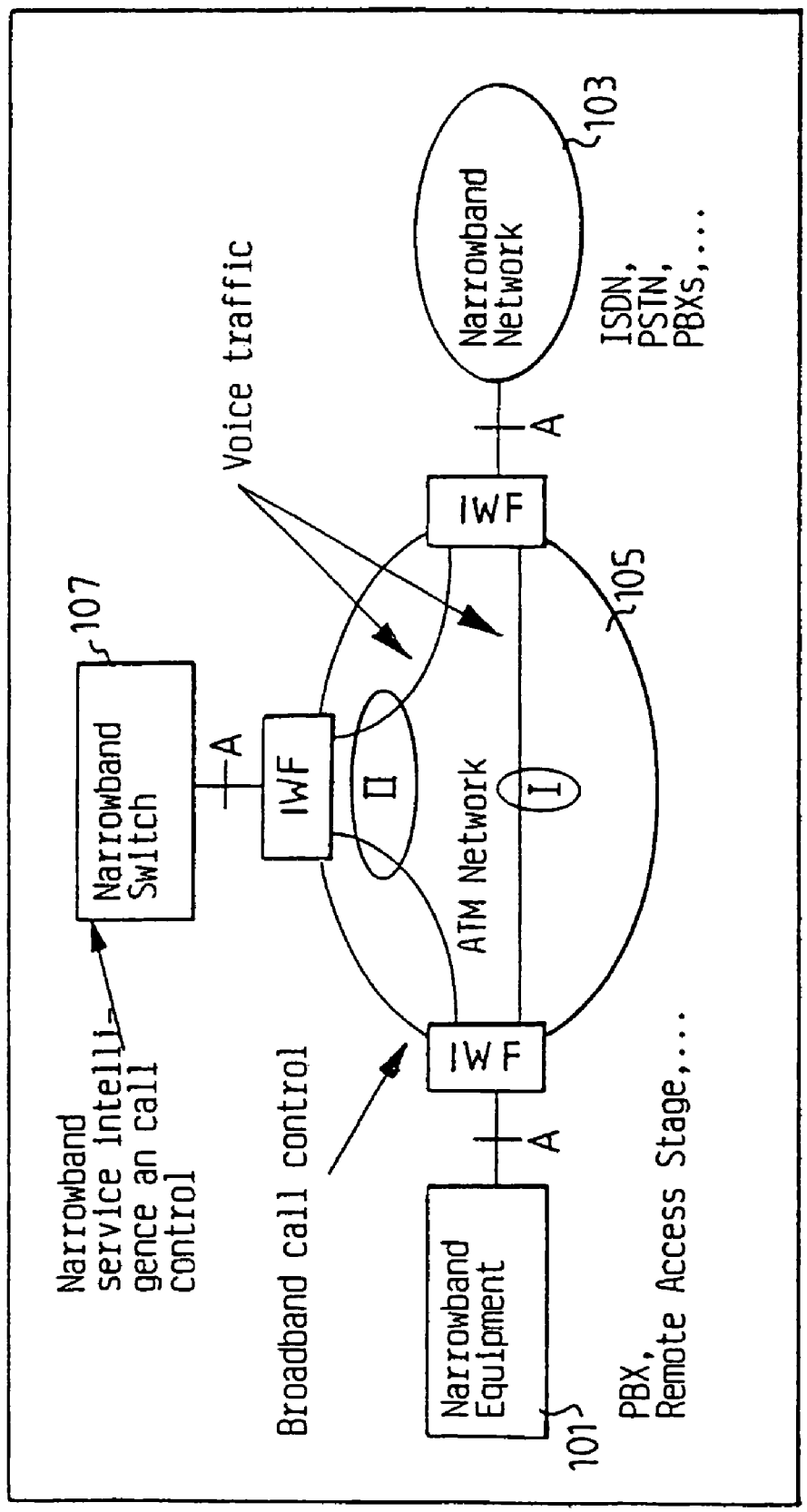
FIG. 1 is an image illustrating the setup of a call connection according to prior art.

Method 1:

A first approach relies on the idea that all routing is performed as far as possible in the call services domain, and that when an actual voice path is required, it will be requested through the bearer services network. This is a serial procedure as indicated below. The network entities referred to are those of FIGS. 1 and 2.

During the narrowband setup, various value added services may be invoked before the actual destination is contacted, if at all. The sequence of events can then be as follows:

1. The narrowband terminal issues a call request to the network by sending e.g. an ISDN SETUP message. This request is analyzed by the virtual switch and any service intelligence may be invoked. The narrowband network addresses are used to analyze the call setup request.

2. After routing analysis and originating call services have been handled the call setup request is routed towards the destination, e.g. through an ISUP IAM message.

3. After analysis and any service invocation at the next virtual switch the egress point is determined. The egress Broadband Terminal (B-TE) 211 is alerted of the exiting call.

4. The egress B-TE 211 or the egress switch emulator 219 notifies the ingress B-TE 209 of the egress B-TE's ATM port address, e.g. by returning the ATM End System Address (AESA), together with information identifying the specific call connection for correlation, e.g. by means of a call identifier in a data field reserved for this purpose.

5. The egress port address is used to either reserve a point-to-point ATM connection for the voice path between the ingress and egress B-TEs, e.g. the path 207 shown in FIG. 2, or to use an existing ATM connection. Optionally the voice path is through-connected already at this point.

6. The egress virtual switch is notified that the voice path is established, and the terminating side can be provided with the call setup request, i.e. either reserved or connected.

7. The call setup request is passed on to the narrowband terminal/network.

8. At reception of a connect message from the N-TE, the ATM path is through-connected if not already done so under 5. above.

9. The release and disconnect procedures are performed in parallel in both the CSN and the BSN.

Method 2:

A second approach is parallel in that the N-Setup procedure and B-Setup procedures are initiated simultaneously. All value added services are invoked in the CSN as the call progresses. At the destination point, the two setup procedures are correlated before the destination is notified of the progressing call.

Figure 5:
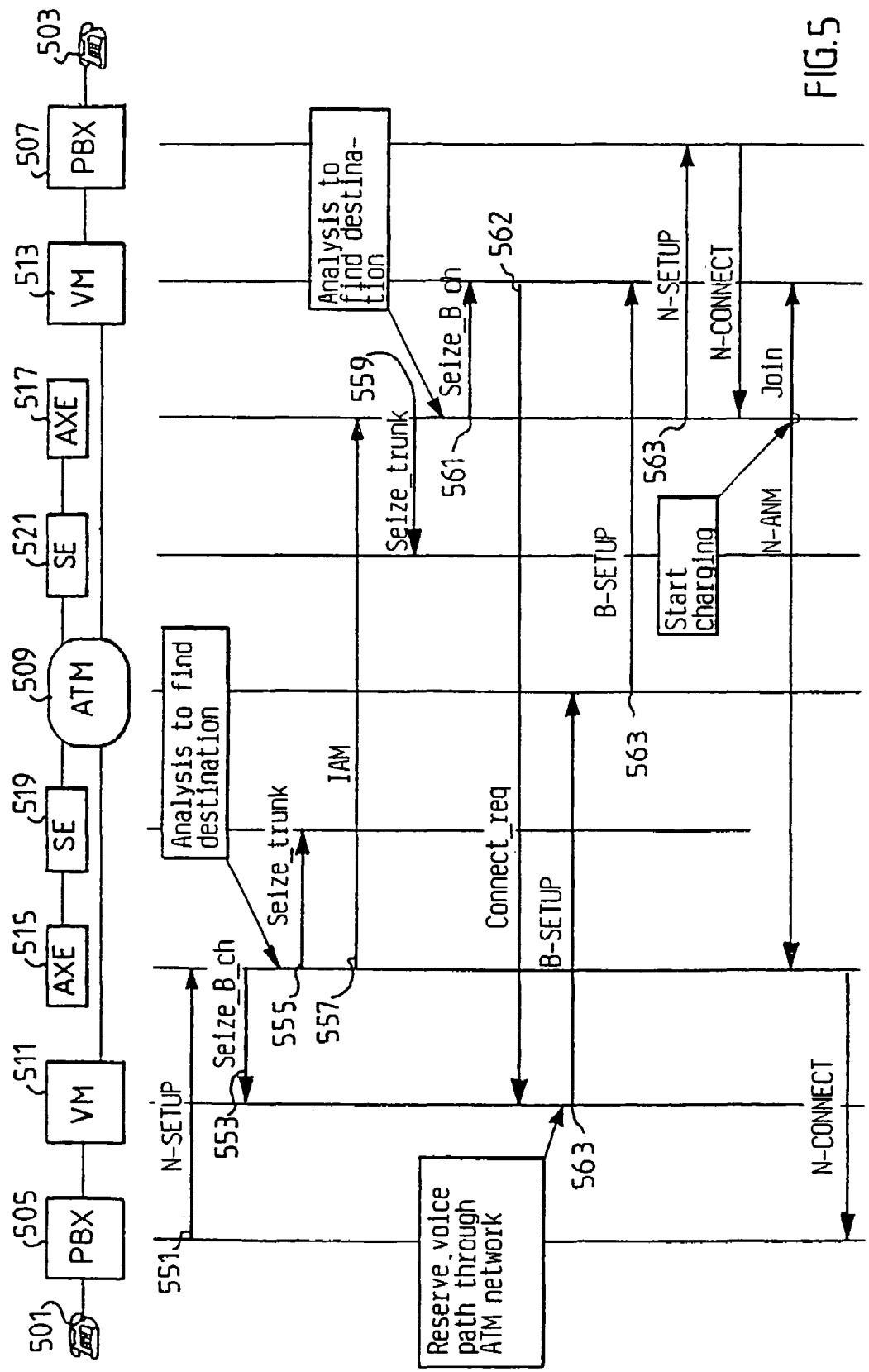
FIG. 5 is a schematic diagram illustrating information flow during a call setup sequence.

In FIG. 5, a call (voice) connection is to be established in a network comprising the units in FIG. 4 on a B-channel from the telephone 501 to the telephone 503, connected to different PBXs 505 and 507, respectively. The two PBXs 505 and 507 are both connected to the same ATM network 509 via voice multiplexers (VM) 511 and 513, respectively. The PBX 505 is connected to the ATM network at a location controlled by a switch 515 and the PBX 507 is connected at a location controlled by a switch 517. Furthermore, logic units or switch emulators (SEs) 519 and 521 are connected to the switches 515 and 517, respectively.

Thus, when a number is dialled by the telephone 501 a setup message 551 is sent to the switch controlling that part of the network, i.e. the switch 515 in this case. The switch then allocates the requested B-channel in the VM 511, as indicated at 553. Thereupon the switch 515 begins to search for the output port from the ATM network 509, i.e. in this case the VM 513.

In this case the switch 515 finds that the output port is located outside the domain of control of the switch 515. The switch 515 requests a trunk towards 517 from the unit which is in possession of the trunk, i.e. the SE 519 in this case. The SE 519 emulates the seizure 555 of a trunk extending from the switch 515 towards the final destination.

When the virtual trunk is seized, a message 557 is transmitted to the switch 517 from the switch 515 for further analysis. Thus, at this point, the switch 515 has logically seized a connection between the input port in the VM 511 and the output port from the switch 515. However, this connection is only emulated by the SE 519.

Thereupon, the switch 517 receives the message 557 and then seizes at 559 its incoming trunk. The SE 521 then emulates the seizure of the trunk. The switch 517 analyses the setup information in order to find the output port from the ATM network. The switch 517, which finds the output port in the VM 513, seizes at 561 the output port, and at the same time connects the connection emulated by the SE 521, which extends from the VM 511 via the emulated connection in the SE 519, all the way to the VM 513.

The VM 513 then finds out that the incoming call requires a real, physical connection through the ATM network and sends a message 562 to the ingress VM 511 comprising the address of the egress VM 513. The ingress VM 511 then establishes an ATM connection to the VM 513 via the message sequence 563.

The switch 517 now knows that the connection is established all the way to the egress port in the VM 513 and notifies the receiving PBX 507 via the message 564.

The voice traffic is then ATM-switched all the way from the VM 511 to the VM 513 without having to be STM switched in the switches 515 and 517. The switches 515 and 517 are, in this case, only used for finding the VM 513, debiting the call and other possible additional services.

Figure 6:
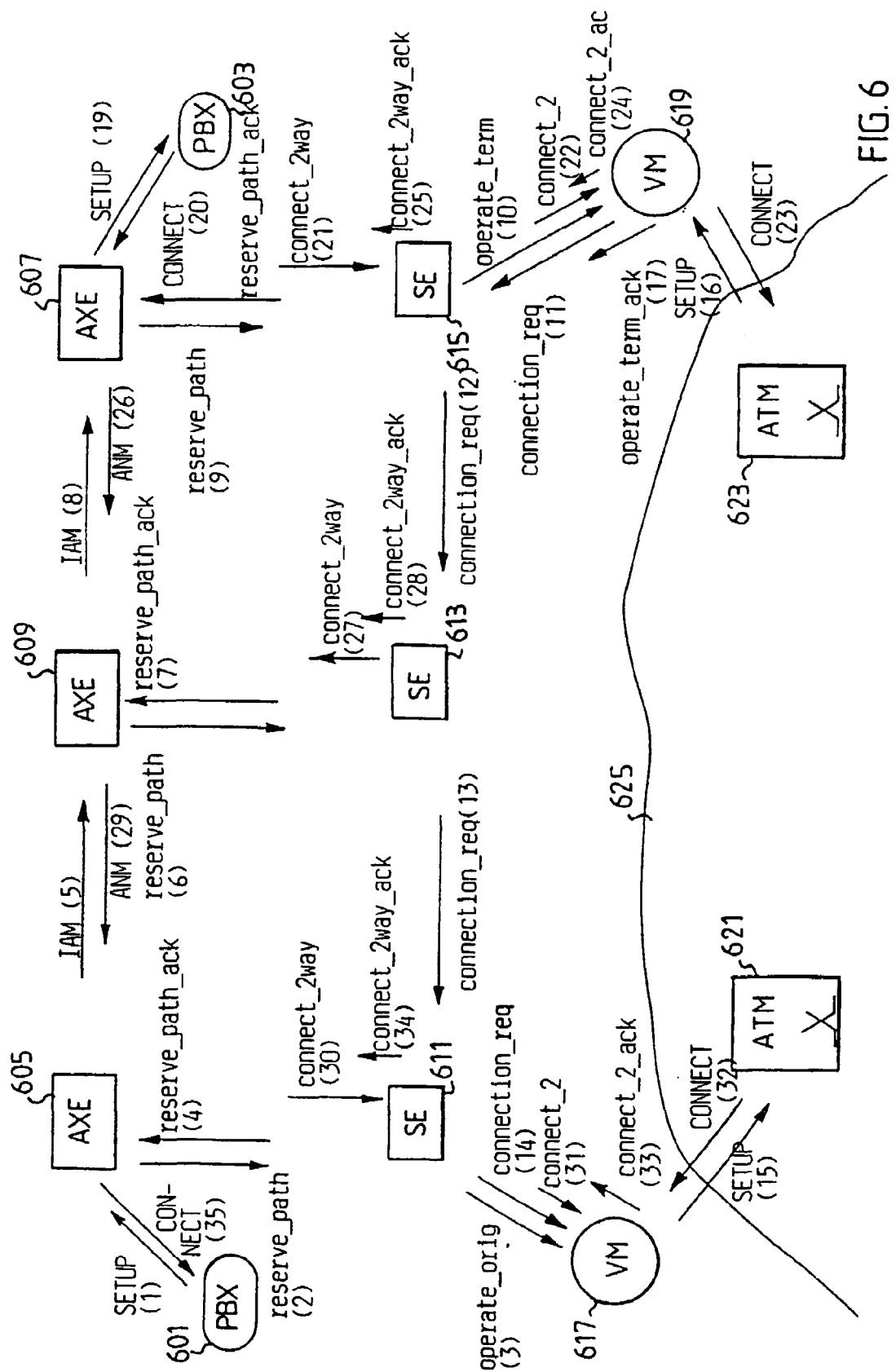
FIG. 6 is a diagram illustrating message flow during a call setup procedure.

In FIG. 6 another example of how a connection can be established is illustrated. The figure shows two PBXs 601 and 603, located at addresses controlled by the switches 605 and 607, respectively. Also shown is a third, transit, switch 609, three switch emulators (SEs) 611, 613 and 615, two voice multiplexers 617 and 619 connected to two ATM switches 621 and 623, which are part of one single ATM network 625.

If a voice connection is to be established between the two PBXs 601 and 603, this can be performed in the following manner. First a setup message 1 is transmitted transparently from the PBX 601 to its corresponding switch 605. The switch 605 through analysis finds out that the final destination for the call is located under another switch associated with a certain trunk. A message 2 for reserving a path between the incoming port in 617 and the outgoing trunk is then sent from the switch 605, which message is intercepted by the SE 611. Next the SE 611 issues a message 3 to the VM 617 for allocating resources in the VM 617 for the connection to be established, and then acknowledges 4 to the switch 605 that a trunk is now reserved.

The switch 605 starts to establish a connection by sending a message 5 to the other switch 609 pointed out by the switch 605 informing that a connection is to be set up and for finding the correct output address from the ATM network for the connection.

The switch 609 receives the message and checks whether the demanded address is controlled by it or if the request has to be forwarded. In this case the request has to be forwarded and the switch 609 reserves at 6 a path between the incoming trunk from the switch 605 and an outgoing trunk towards the switch 607 pointed out by the switch 609. The incoming and outgoing trunks are then connected.

The reservation message 6 is intercepted by the SE 613 associated with the switch 609, and the SE emulates a trunk reservation and that the connection is now established to the switch 609 and switch emulator 613, by means of responding by sending an acknowledgement message 7 informing the switch 609 that a trunk is reserved.

Since the final destination for the call was not found under the switch 609, a message 8 is sent to the switch 607 for setting up the connection. The switch 607 receives the message 8 and finds that the final destination is controlled by the switch 607, and issues a message 9 for reserving a connection to the end terminal, i.e. the VM 619. The SE 615 intercepts the message 9 and sends a message 10 to the VM 619 for reserving resources in the VM 619 for the connection. At reception of the message 10 an emulated end-to-end connection between the VM 617 and the VM 619 is established.

The VM 619 determines that a real connection is to be established through the ATM network 625, which corresponds to the emulated connection through the SEs 611, 613 and 615, and replies with a request 11 containing the address of the VM 619 for establishing a connection, which request is returned via the messages 12, 13 and 14 to the VM 617 which is connected to the PBX wherefrom the original setup message was generated. Hence, the VM 617 now has knowledge of the output address of the ATM network to which it shall address the voice traffic. The VM 617 sends a setup message 15 to the ATM switch to which it is connected containing the address which was returned in the return messages 11, 12, 13 and 14, or uses an already existing ATM connection. The figure illustrates the case when a new connection is established.

The setup message is ATM switched through the ATM network 625 to the ATM switch 623, which is connected to the VM 619. The setup message 16 is then sent from the ATM switch 623 to the VM 619. The VM 619 then acknowledges the connection setup request 10 to the SE 615 via a message 17. The SE then sends a message 18 to the switch 607 to confirm the connection establishment, as a response to the message 9.

The switch 607 then sends a setup message 19 transparently to the intended receiver, in this case the PBX 603, which replies with a message 20 answering the call request. The switch 607 receives the message 20 and requests a through-connection by issuing a message 21. The two-way through-connection request message 21 is intercepted by the SE 615, which sends a message 22 to the VM 619 requesting a two-way ATM through-connection to the VM 617 from the VM 619. Therefore, the VM 619 forwards the two-way through-connect message 23 to the ATM switch 623 and returns an acknowledgment message 24 to the SE 615. The two-way through-connect message 23 is forwarded through the ATM network 625 to the ATM switch 621 which sends a through-connect message 32 to the VM 617. At the same time, the messages 24–31 are sent back to the VM 617.

Thus, first acknowledgement messages 24 and 25 are returned from the VM 619 via the SE 615 to the switch 607. The switch 607 then starts to through-connect backwards to the PBX 601. This is performed by the answer message 26 to the switch 609, which issues a two-way through-connect 27, which is intercepted by the SE 613, which then marks the emulated path as through-connected, and returns an acknowledge message 28, similar messages 29, 30 and 31 being transmitted from the switch 609 to the VM 617 via the switch 605 and the SE 611.

After reception of the messages 31 and 32, the VM 617 issues an acknowledge message 33 to the SE 611, which forwards a message 34 to the switch 605 as a final through-connect acknowledgment. Finally the switch 605 sends a connect message 35 to the PBX 601.

In this manner a physical voice connection is established from the PBX 601 to the PBX 603 via the VM 617, via the ATM network 625, and via the VM 619, which is ATM switched all the way through the ATM network 625.

Figure 7:
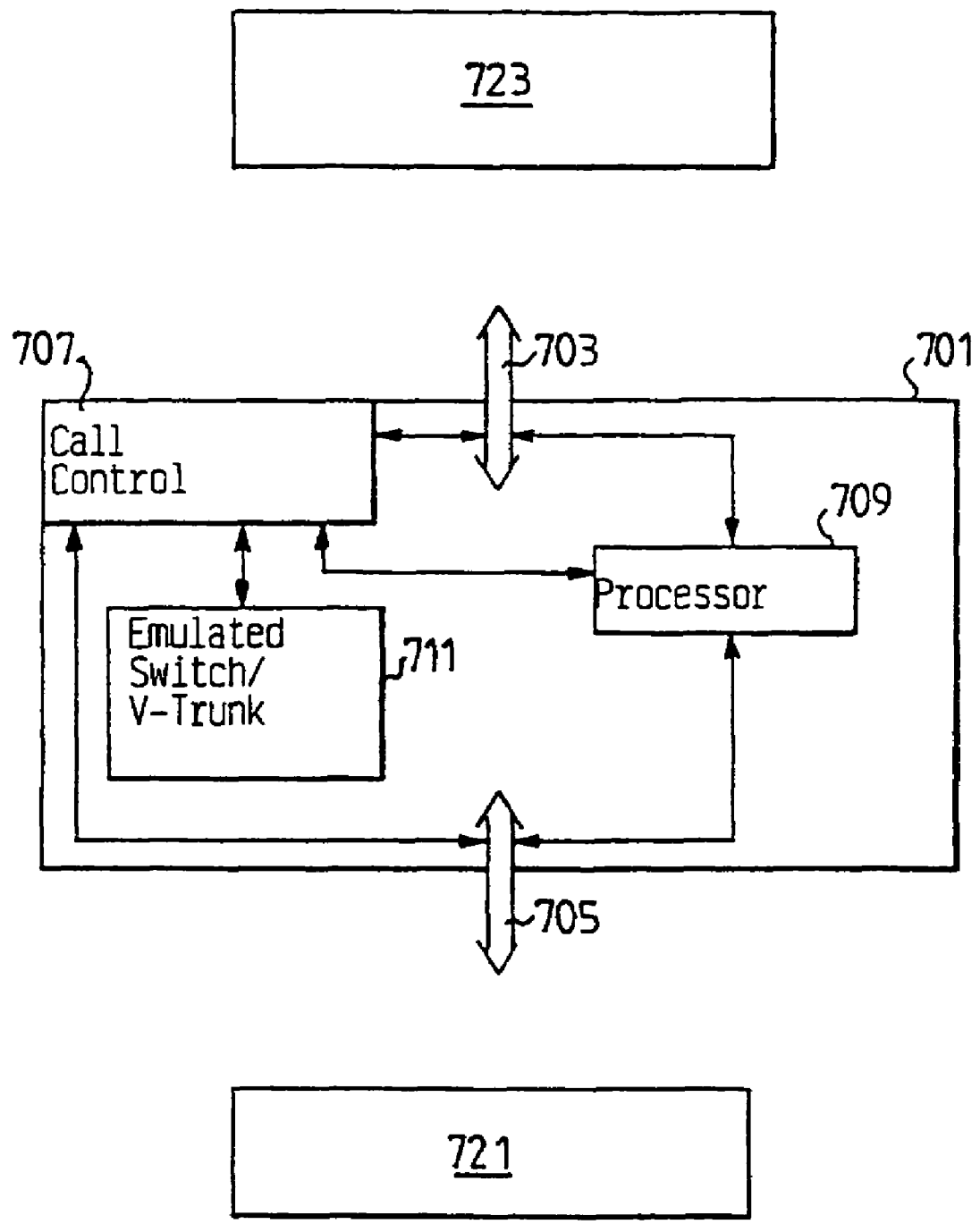
FIG. 7 is a schematic image of a switch emulator.

In FIG. 7 the elements of, the functions performed by, and the connections attached to the logical units or switch emulators (SEs) are illustrated. Thus, a logical unit or switch emulator 701 has input/output means 703 for communicating with a narrowband switch, shown at 723, and means 705 for communicating with units attached to an ATM network, shown at 721, such as for example voice multiplexers, etc. Furthermore, the unit 701 has means 707 and 711 connected to the input/output means 703 for emulating an STM switch fabric.

The unit 701 also has a processor unit 709 including a memory for storing information connected to the input/output means 703 and 705. The processor unit 709 controls the signal flow inside the unit 701. The memory in the processor unit 709 can be used for storing information regarding ongoing connections and transactions. The memory can also be used for temporary or permanent storing of information regarding the ATM network to which the unit 701 is connected, such information can be fetched from the databases used by the narrowband switch, via the input/output means 703.

The processor unit 709 controls a call control unit 707, which provides the functions of accessing physical ports connected to the ATM network, e.g. located in voice multiplexers, and controlling the functions in a unit 711. In the unit 711 switch emulation and virtual trunk functions are located. Thus, in the unit 711, input ports and output ports are associated by means of the switch emulator function, and virtual trunk are provided by the virtual trunk function. The unit 711 also handles accesses in broadband terminals, e.g. voice multiplexers, attached to the ATM network. The access is made trough the input/output means 705.

Figure 8D:
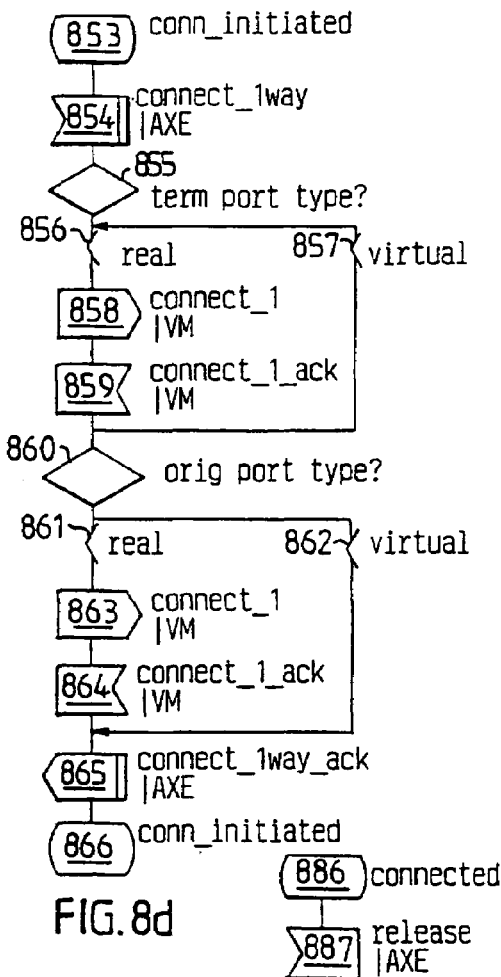

The operation of a switch emulator (SE), as described above in conjunction with FIGS. 4–7, will now be described by means of the flow charts in FIGS. 8a–8f. Hence, FIG. 8a is a flow chart illustrating the steps carried out in a switch emulator (SE) when a request to establish a connection is received. Thus, first, in block 800 the process is idle. Thereupon, in block 801, a message comes from the narrowband switch, with which the SE is associated and to which it is connected, requesting reservation of the incoming port, the outgoing port and a connection thereinbetween.

Next, in a block 803, the SE checks and determines from which type of port the request originates. If the requested originating port is a real physical port, i.e. an access in a voice multiplexer, the real access branch 805 is taken and the SE reserves a physical port in that voice multiplexer in the block 809. If, on the other hand the requested port is a virtual trunk, the branch 807 is taken and in block 811 the SE marks the virtual trunk, or rather a virtual channel in the virtual trunk, as reserved.

Thereupon the SE identifies the outgoing port type in the block 813. If the outgoing port type is a real access in a voice multiplexer the branch 815 is taken, and if the outgoing port type is a virtual trunk the branch 817 is taken. If the branch 815 is taken, the process proceeds to the block 819 in which the SE reserves the terminating physical port in the voice multiplexer. The process then continues to a block 825 wherein the process is marked in a state indicating that the connection is requested reserved.

If the branch 817 is taken, the process marks the virtual trunk, or rather a virtual channel in the virtual trunk, as reserved, and then, in a block 823, notifies the narrowband switch to which the SE is connected, that the request received in the block 801 is now fulfilled. Next, the process continues to the block 825.

In FIG. 8b, the process is initially waiting in the state with the connection marked as requested reserved, i.e. the state of block 825. This is indicated in a block 827. A request for establishment of a physical connection is then received from another SE or from a voice multiplexer in a block 829. The SE then determines whereto the request is to be forwarded, this being carried out by means of table look-ups, etc., in a block 831.

Next, in a block 833, the request for a physical connection is forwarded to the next unit in the network to which the SE is attached, in this case another SE or a voice multiplexer. Thereupon in a block 835, the type of the locally controlled port terminating in the SE is identified. If the port type is determined to be a physical port the branch 837 is taken and the process is marked in a state where the connection is marked reserved, in a block 841.

If, on the other hand, the terminating port type is determined to be a virtual trunk in the block 835, the branch 839 is taken, and the process is marked in a state with the physical connection started in a block 843.

In FIG. 8c the process is initially waiting in a state where a connection is reserved, i.e. block 845. A message is then received in a block 847 from a terminating voice multiplexer notifying the SE that the processing of the connection request to the side containing the ATM network egress port now is completed. The process then continues to a block 849 where a message is sent to the narrowband switch notifying the switch that the connection is now reserved, and the process is then marked in a state with the physical connection started in a block 851.

In FIG. 8d, the process is initially waiting in a state with a physical connection started, block 853. The SE then, in a block 854, receives a message from the narrowband switch notifying the SE that the connection is to be through-connected in one direction, i.e. a one-way through-connect.

Next, the SE identifies the terminating port type in a block 855. If the terminating port type is determined to be a real, physical port, the branch 856 is taken, and the SE orders a one way through-connect of the terminating port in the voice multiplexer in a block 858 and then receives an acknowledgement message from the voice multiplexer acknowledging the completion of the one-way through-connect in the voice multiplexer from the voice multiplexer in a block 859. The process then continues to a block 860.

If, on the other hand, the terminating port type is determined to be a virtual trunk in the block 855 the branch 857 is taken and the process proceeds directly to the block 860.

In the block 860, the SE identifies the originating port type. If the originating port is determined to be a real, physical port the branch 861 is taken, and the SE orders a one-way through-connect of the originating port in the corresponding voice multiplexer in a block 863, and the voice multiplexer responds with an acknowledgement message to the SE when the one-way through-connect is carried out in the voice multiplexer, block 864. The process then proceeds to a block 865.

If, on the other hand, the originating port type is determined to be a virtual trunk in the block 860, the branch 862 is taken, and the process proceeds directly to the block 865.

In the block 865 the SE notifies the narrowband switch that the connection is one-way through-connected, and the process then proceeds to a block 866 in which the process is marked in a state with a physical connection started.

Figure 8E:
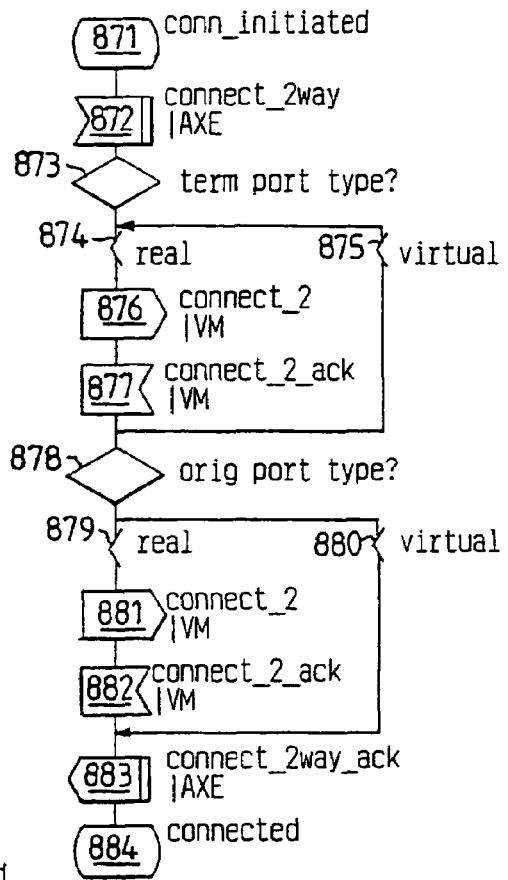

In FIG. 8e, the process is initially waiting in a state marked with a physical connection started, block 871. The SE then, in a block 872, receives a message from the narrowband switch notifying the SE that the connection is to be through-connected both ways, i.e. two-way through-connected. Thereupon, the SE identifies the terminating port type in a block 873.

If the terminating port type is determined to be a real, physical port, the branch 874 is taken, and the process continues to a block 876. In the block 876 the SE orders a two-way through-connect of the terminating port in the corresponding voice multiplexer, and the voice multiplexer returns an acknowledgement to the SE when the two-way through-connect is carried out, block 877. The procedure then proceeds to a block 878.

If, on the other hand, the terminating port is determined to be a virtual trunk in the block 873, the branch 875 is taken, and the process proceeds directly to the block 878.

In the block 878 the SE identifies the originating port type. If the originating port type is determined to be a real, physical port, the branch 879 is taken, and the process continues to a block 881. In the block 881 the SE orders a two-way through-connect of the originating port in the corresponding voice multiplexer, and the voice multiplexer returns an acknowledgement message to the SE when the two-way through-connect is carried out, block 882. Thereupon the process proceeds to a block 883.

If, on the other hand, the originating port is determined to be a virtual trunk in the block 878, the branch 880 is taken, and the process proceeds directly to the block 883.

In the block 883 the SE notifies the narrowband switch that the connection is two-way through-connected, and the process then proceeds to a block 884 in which the process is marked in a state with a physical connection through-connected.

Figure 8F:
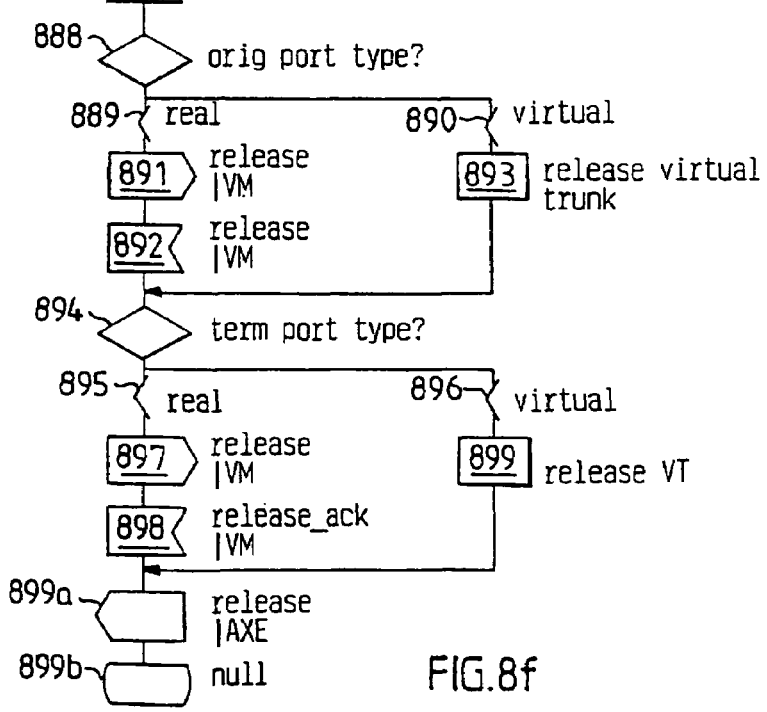

In FIG. 8f, the process is initially in a state waiting with a connection through-connected, block 886. The SE then receives a message of release of the established, through-connected connection from the narrowband switch in a block 887. The process then continues to a block 888, in which the SE identifies the originating port type.

If the originating port type is determined to be a real, physical port in block 888, the branch 889 is taken, and a message requesting release of the physical resource is sent to the corresponding voice multiplexer in a block 891, and the voice multiplexer returns a message confirming that the resource now is released in a block 892. The process then proceeds to a block 894.

If, on the other hand, the originating port is determined to be a virtual trunk in the block 888, the branch 890 is taken, and the virtual trunk is marked idle in a block 893. The process then proceeds to the block 894.

In the block 894 the SE identifies the terminating port type. If the terminating port type is determined to be a real, physical port in block 894, the branch 895 is taken, and a message requesting release of the physical resource is sent to the corresponding voice multiplexer in a block 897, and the voice multiplexer returns a message confirming that the resource now is released in a block 898. The process then proceeds to a block 899a.

If, on the other hand, the terminating port is determined to be a virtual trunk in the block 894, the branch 896 is taken, and the virtual trunk is marked idle in a block 899, and the process then proceeds to the block 899a.

In the block 899a the SE notifies the narrowband switch that the release of the connection now is carried out, and the process proceeds to a block 899b, in which the process is marked idle.

In FIGS. 9a–9e, the logic used in a voice multiplexer (VM) for obtaining ATM switching of a voice connection is illustrated as flow charts. Thus, in block 901 in FIG. 9a, the process is idle. Then, if a message for seizing originating resources in the VM, is received from the SE in a block 903, the VM allocates hardware resources in the VM in a block 907, and the process proceeds to a block 919 wherein the process is placed in a state with a port reserved. If, when the process is in the idle state in block 901, a message is received from the SE for seizing terminating resources in the VM in block 905, the VM allocates hardware resources in the VM in a block 909 and the process proceeds to a block 911 wherein the VM identifies if a new ATM connection is required or if an existing ATM connection can be used.

If a new connection is required, the branch 913 is taken, and a message is sent towards the originating side informing this that a connection is required to the output port identified with the terminating AESA and a call identification for correlation. The process then proceeds to the block 919.

If, on the other hand, an existing connection can be used, the branch 915 is taken, and the procedure continues to a block 921. In the block 921 a subchannel on the ATM connection for the call in question is selected and associated with the output port.

Next, the VM sends a message requesting the subchannel to the originating VM in a block 923 and the process then proceeds to a block 925. In the block 925 the VM informs the SE that the physical connection now is reserved, and the process is then placed in a state with the physical connection reserved in a block 927.

In FIG. 9b, the process in the VM is initially in a state with a port reserved, block 941. If the VM then receives a request for a new ATM connection from an originating VM in a block 943, the process proceeds to a block 945. In the block 945, the VM associates the ATM connection with an output port towards an end user, e.g. a PBX. Thereupon, in a block 947, the VM sends call proceeding message to the ATM switch in the ATM network to which the VM is connecting informing the ATM switch of the processing, and sends a message to the SE informing the SE that the output port and the connection towards the originating port now are reserved in a block 949. The process then proceeds to a block 975.

If the process when waiting in the state with a port reserved in block 941 receives a message requesting a connection from the SE in a block 951, the process proceeds to a block 955. In the block 955 the VM determines if a new or an already existing ATM connection is to be used. If the VM determines that a new ATM connection is to be used the branch 957 is taken and the process continues to a block 961. In the block 961 a message requesting a new ATM connection is sent to the ATM network, and the new ATM connection is connected to the input port, and the process proceeds to the block 975.

If, on the other hand, it is determined in the block 955 that an already existing ATM connection is to be used, the branch 959 is taken. The process then proceeds to a block 963 in which a subchannel in the existing ATM connection is selected and this is connected to the input port, e.g. towards a PBX. Next, the VM sends a message requesting reservation of the subchannel to the terminating VM in a block 965, whereafter the process continues to the block 975 in which the process is placed in a state with the physical connection reserved.

If the process when waiting in the state with a port reserved in block 941 receives a message requesting a sub channel to a terminating VM in a block 967, the process proceeds to a block 968 in which it is determined if the VM is originating or terminating. If the VM is terminating the process proceeds to a block 969, via a branch 968b. In the block 969 the VM associates the subchannel with the output port. Thereupon, the VM sends a message to the SE informing the SE that the output port and the connection towards the originating port now are reserved in a block 971, and the process then proceeds to a block 973 in which the process is placed in a state with the physical connection reserved.

If it is determined in the block 968 that the VM is originating the branch 968a is taken. The process then proceeds to a block 970. In the block the VM associates the subchannel with the input port. The process the continues to the block 973.

In FIG. 9c, the process is initially waiting in a state with a physical connection reserved, block 977. A message of a one-way through-connect is then received by the VM in a block 978. Next, an alert message is sent to the ATM network in a block 979 informing the ATM switch of that the alert signal now is present in the VM, and then an acknowledgment message informing the SE that a one-why through-connection is established is returned to the SE in a block 980. Thereafter, the process is placed in a state with the physical connection reserved in a block 981.

Figure 9A:
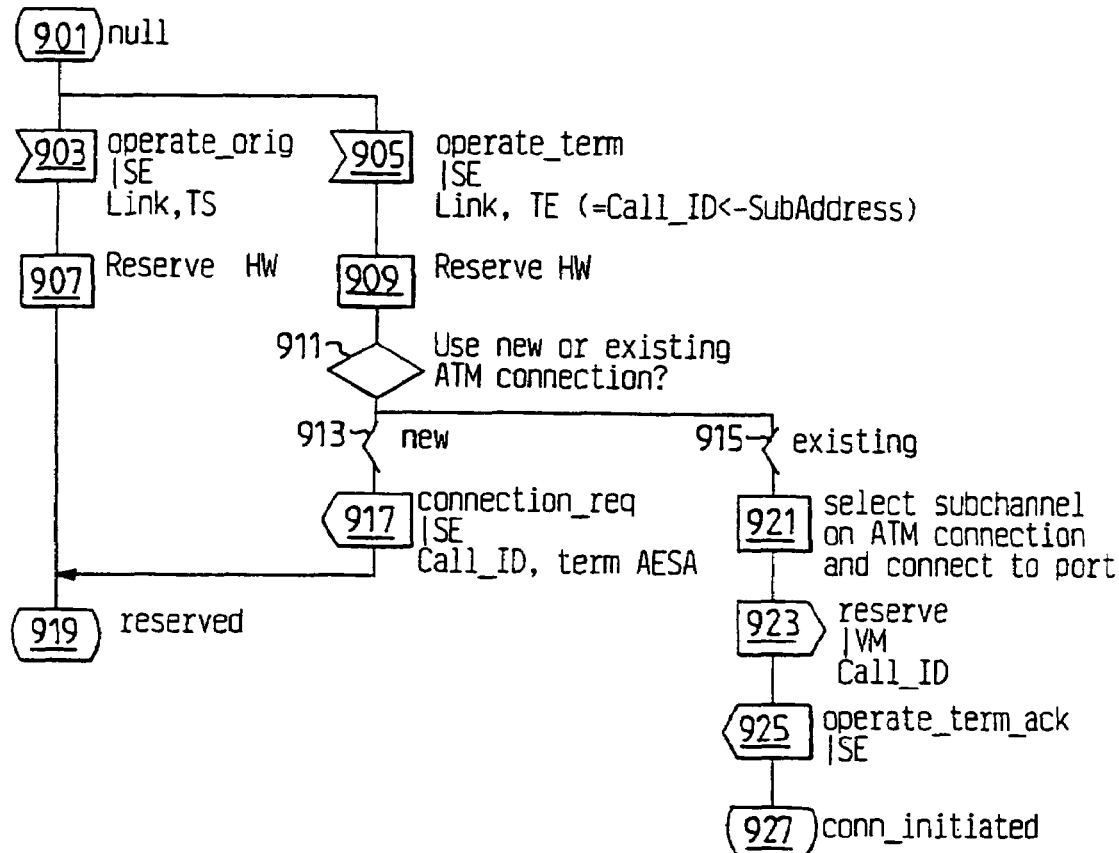
Figure 9D:
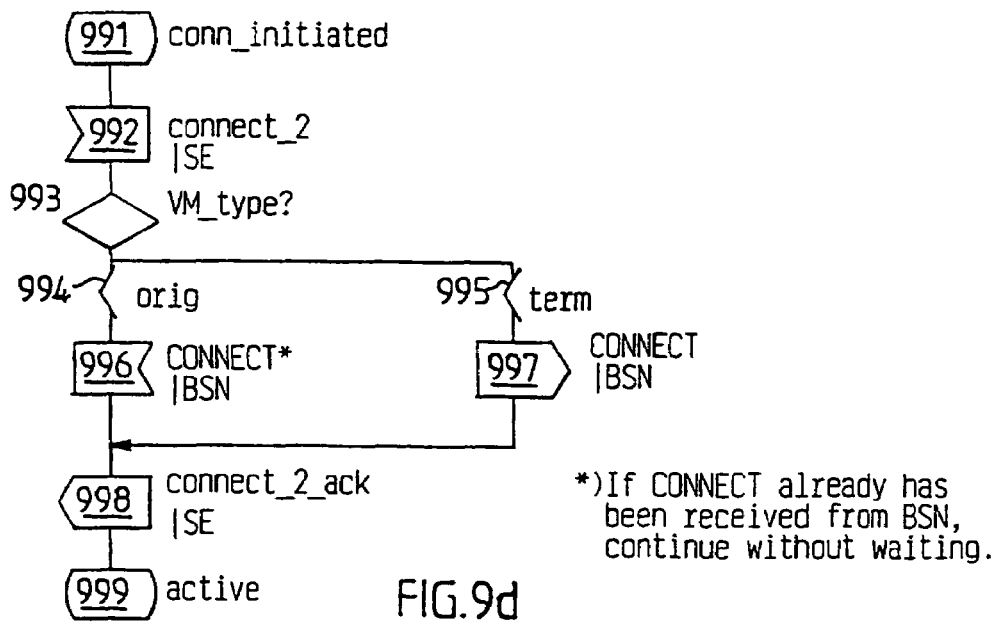

In FIG. 9d, the process is initially waiting in a state with the physical connection reserved, block 991. The VM then receives a message for a two-way through-connection from the SE in a block 992. Next, the VM then identifies if the VM is terminating or originating in a block 993. If the VM is originating, the branch 994 is taken and the process proceeds to a block 996. In the block 996 the process waits until a connect message from the ATM switch containing information on that the connected side now has accepted the call, is received from the ATM network, if not already done so. The process then continues to a block 998.

If the VM is determined to be terminating in the block 993, the branch 995 is taken and the process proceeds to a block 997, in which a connect message is sent to the ATM network requesting that the connection is trough-connected. Next, the process continues to the block 998 in which the VM returns an acknowledgment message to the SE informing the SE that a two-way through-connect now is established. Thereupon the process is placed in a state with an active connection.

In FIG. 9e, the process is initially waiting in a state with an active connection, block 982. The VM then in a block 983 receives a message from the SE of releasing of the connection and releasing the resources in the VM. The process then proceeds to a block 984. In the block 984 the VM releases all resources associated with the call in the VM, and the process proceeds to a block 985. Next, in the block 985 the VM determines whether the existing ATM connection is to be released or not.

If the decision in the block 985 is no the branch 986 is taken and the process continues to a block 989. If the decision in the block 985 is yes the branch 987 is taken, and a message for releasing the ATM connection is sent to the ATM network, i.e. all ATM switches involved in the connection, in a block 988. Thereupon, the process proceeds to the block 989, in which a message informing the SE that the release request received in block 983 now is completed is sent to the SE. The process then returns to an idle state in the block 990.

The method and the system as described herein can also be used for other network services where existing systems and networks provide service logic, but where the fundamental transport mechanism is to be changed to ATM. One, example is the Frame Relay Service.

Furthermore, by using the method and the system as described, bandwidth resources are more efficiently used since all switching is done by ATM regardless of application. Heavy investments in providing intelligent services support by existing systems can be reused in an efficient way and thus reduce time to market for the introduction of the value added services.

The invention claimed is:

1. A switch emulator which seizes a virtual trunk for establishing an emulated connection between a bearer services network entry port and a bearer services network exit port, the virtual trunk being seized by the switch emulator in response to a request issued by a narrowband switch in a call services network upon receipt of a call setup message, the emulated connection being used for sending information to the bearer services network entry port so that a physical connection can be established through the bearer services network;
wherein the switch emulator emulates a STM connection to the narrowband switch and the bearer services network comprises an ATM network, and wherein the switch emulator comprises:

means for storing path requests received from the narrowband switch,
means for acknowledging paths requests to the narrowband switch, and
means for associating an incoming port with an outgoing port.

2. The switch emulator of claim 1, further comprising:
means for contacting broadband terminals connected to a telecommunication network.

3. The switch emulator of claim 2, further comprising:
means for sending an address of one broadband terminal to another broadband terminal connected to a same network.

4. The switch emulator of claim 3, wherein the address sent is an ATM End System Address (AESA).

5. The switch emulator of claim 3, further comprising:
means for sending call identification information for correlation to the address.

6. The switch emulator of claim 1, further comprising:
means for deciding if an already existing connection via the ATM network is to be used or if a new ATM connection is to be established.

7. The switch emulator of claim 4, further comprising:
means for sending call identification information for correlation to the address.

8. A method of operating a switch emulator which emulates a STM connection to a narrowband switch, the method comprising:
seizing a virtual trunk for establishing an emulated connection between a bearer services network entry port and a bearer services network exit port, the bearer services network comprising an ATM network, the virtual trunk being seized by the switch emulator in response to a request issued by the narrowband switch in a call services network upon receipt of a call setup message;
using the emulated connection for sending information to the bearer services network entry port so that a physical connection can be established through the bearer services network;
storing path requests received from the narrowband switch;
acknowledging paths requests to the narrowband switch, and associating an incoming port with an outgoing port.

9. The method of claim 8, further comprising contacting broadband terminals connected to a telecommunication network.

10. The method of claim 9, further comprising sending an address of one broadband terminal to another broadband terminal connected to a same network.

11. The method of claim 10, wherein the address sent is the an End System Address (AESA).

12. The method of claim 10, further comprising sending call identification information for correlation to the address.

13. The method of claim 8, further comprising deciding if an already existing connection via the ATM network is to be used or if a new ATM connection is to be established.

14. The method of claim 13, further comprising sending call identification information for correlation to the address.

* * * * *